Figure 1:
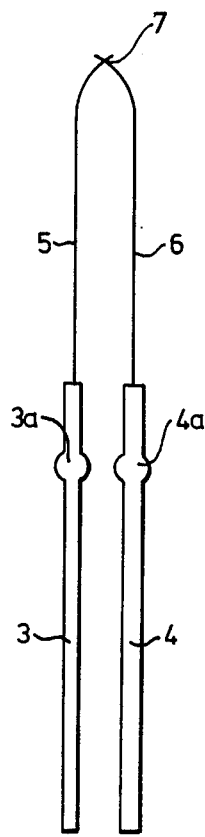

United States Patent [19]
Nichols

[11] 4,125,738
[45] Nov. 14, 1978

[54] THERMOCOUPLE ELEMENT

[75] Inventor: Michael J. Nichols, Birtley, England

[73] Assignee: Thermal Syndicate Limited, Wallsend, England

[21] Appl. No.: 817,664

[22] Filed: Jul. 21, 1977

[51] Int. Cl.² .................................................. H01L 35/02
[52] U.S. Cl. ..................................... 136/234; 73/359 R; 136/233
[58] Field of Search ................ 136/230, 232, 233, 234; 73/359 R

[56] References Cited
U.S. PATENT DOCUMENTS 3,664,882   5/1972   Hance ..................................... 136/234

OTHER PUBLICATIONS

Oliver, et al. The Iron Age, Jul. 27, 1944, pp. 39 to 41 and 124.

Primary Examiner—Leland A. Sebastian
Attorney, Agent, or Firm—Michael J. Striker

[57] ABSTRACT

The invention relates to an improved high temperature (e.g., up to 1800° C) hot junction element for a thermocouple circuit which comprises a vitreous silica tube enclosing the thermocouple wires and the hot junction thereof, and having contact elements (by which the wires are connected into the thermocouple circuit) protruding from one end of the tube. The thermocouple wires are loosely located within the tube but are separated by a barrier formed from the tube wall. Suitably the barrier is the wall of a passage extending across the bore of the tube.

13 Claims, 4 Drawing Figures

U.S. Patent     Nov. 14, 1978     4,125,738

THERMOCOUPLE ELEMENT

This invention relates to a hot junction element for a high temperature thermocouple measuring circuit. It is well known that the temperatures of molten metal baths can be determined by a thermocouple measuring circuit, which includes a hot junction element which is dipped into the bath, the element incorporating the dissimilar thermocouple wires which meet at the junction and contact members by which the thermocouple wires are electrically connected to the remainder of the measuring circuit. It is conventional to construct such junction elements as cheaply as possible since their service life under the extreme operating conditions is normally not more than a few dips and not infrequently a junction element of this type is used for just one dip and then discarded.

This invention relates to an improved disposable hot junction element which in its preferred embodiments enables reduced quantities of thermocouple wires to be used (and since these are usually made from very expensive metals, a small saving in the quantity used can significantly affect the cost of an element) and improves the ruggedness of the element enabling the cost/dip to be reduced by increasing the service life of the element.

U.K. specification No. 1022172 describes a hot junction element for a high temperature thermocouple which comprises a hollow tube of vitreous silica material, a pair of dissimilar thermocouple wires forming a thermocouple junction sealed within the tube and each connected to a different contact member extending from an end of the tube.

The junction element described in U.K. specification No. 1022172 leaves the junction of the thermocouple wires exposed and tensions the thermocouple wires within the tube to keep them separated within the tube. This form of construction does not lend itself to automatic production techniques, the manufacture being difficult and resulting in a high proportion of unsaleable junction elements, the cost of which adds to the unit cost of the saleable elements.

This invention relates to an improved hot junction element in which the thermocouple wires are disposed loosely within the tube but are separated between the thermocouple junction and the contact members by a barrier means formed from the tube wall.

The dissimilar thermocouple wires are conveniently very fine wires of metals or alloys of nickel, chromium, aluminum, tungsten, molybdenum, platinum, rhodium or platinum/rhodium alloys which can be twisted together or welded to form the thermocouple junction. The use of a connecting conducting bridge between the ends of the thermocouple wires at the thermocouple junction is not ruled out.

The contact members may be spaced-apart pins projecting through the end of the tube, to which the end of the appropriate thermocouple wire is connected (e.g., crimped or welded). The contact members may also be of dissimilar metals (e.g., copper and copper/nickel) to act as compensating leads in a manner well known in the art. Further the contact members may be physically distinguishable one from the other (as by length or cross-sectional area) to ensure correct polarity connection to the rest of the measuring circuit.

The barrier means is a deformed region of the wall of the tube and the deformed region is suitably large enough to allow molten metal into which the junction element is dipped to come close to the thermocouple junction. In this way the response time of the junction element is reduced. Preferably the deformed region defines a melt passage across the bore of the tube.

Figure 2:
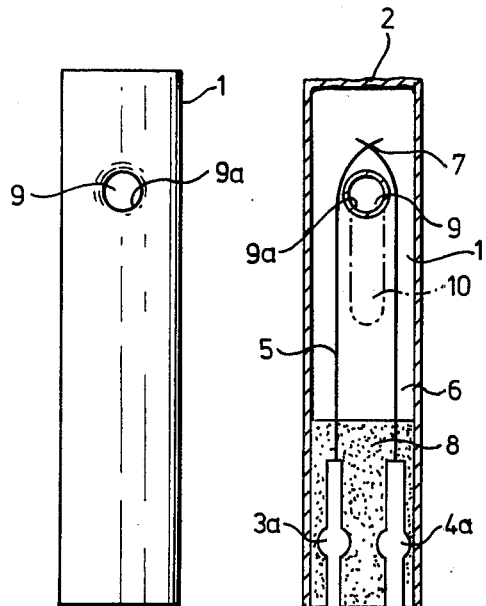
Figure 3:
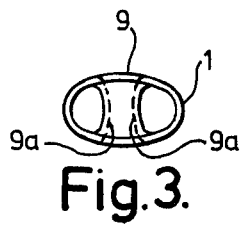
Figure 4:
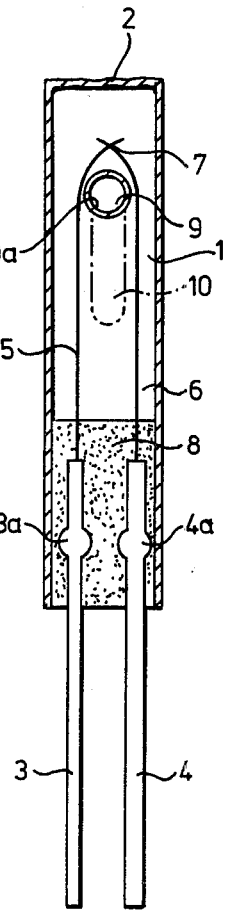

One embodiment of hot junction element in accordance with the invention and a method in which it can be constructed will now be described, by way of example, with reference to the accompanying drawing, in which:

FIG. 1 is a side elevation of the electrical components of the element prior to insertion in the vitreous silica tube, FIGS. 2 and 3 are, respectively, a side elevation and an end elevation of the vitreous silica tube used with the components of FIG. 1 to make a complete junction element, and FIG. 4 is a sectional view of the complete junction element.

Referring to FIG. 4, the complete junction element comprises a tube 1 of transparent vitreous silica closed by pinching at 2 and pinched around compensating pins 3 and 4 at the other end. The pins 3 and 4 are slightly flattened over regions 3a and 4a to enhance their securement in the pinched tube.

Thermocouple wires 5 and 6 connect the pins 3 and 4 to a thermocouple junction 7 which is located close to the pinch 2 but within the interior of the tube. Welding is used to bond the wires to each other at the junction 7 and to bond each wire to its pin.

The pins are of different gauge to ensure that the element can only be plugged into its receiving socket (and thus connected into the remainder of the measuring circuit) one way round. A refractory cement 8 fills the lower end of the tube 1 more securely to bond the pins to the tube and to thermally insulate the junctions between the wires and the pins.

To space the wires 5 and 6 apart in the region between the pins and the junction 7, a hole 9 is provided through the tube 1 to define an insulating barrier 9a between the wires 5 and 6.

The element shown in FIG. 4 is manufactured from the parts shown in FIGS. 1 and 2 by lowering the pins 3 and 4 into the tube 1 from above until the junction 7 is disposed just above (or even resting on) the barrier 9a, pinching the tube lightly around the regions 3a and 4a, injecting the cement 8 into the lower end of the tube and finally pinching the end 2 to close the tube.

The element illustrated in FIG. 4 is designed for temperature measurements in the range 500° C. to 1800° C. Pin 3 is of 1.42 mm diameter and is made of copper/nickel alloy, pin 4 is of 1.63 mm diameter and is made of copper, wire 5 is of 0.075 mm diameter platinum and wire 6 is 0.075 mm diameter and is a 13% rhodium/87% platinum alloy. The overall length of the oval cross-section tube 1 is 45 mm and the undistorted bore is 8–9 mm in the direction of the major axis and 2–3 mm in the direction of the minor axis. The hole 9 has a bore of approximately 3 mm and the cement 8 (e.g., Plaster of Paris) extends 3 mm beyond the upper ends of the pins 3 and 4.

In place of a hole 9, an elongate recess (shown dotted at 10 in FIG. 4) can be provided. The hole (or recess) allows molten metal to come close to the junction 7 and thereby reduces the time taken for the element to record the true temperature of a melt after having been first dipped into the melt.

The volume within the tube may be sealed but a small gas vent can be provided (to reduce pressure rise on dipping) and this may be incorporated in the cement 8.

When the wires 5 and 6 become very fine, welding them to the more robust pins 3 and 4 may pose problems. Crimping is an alternative fixing means which can be used.

Although the embodiment illustrated employs a tube 1 of oval cross-section as the starting material this is not essential and other cross-sectional shapes can be employed.

What is claimed is:

1. A hot junction element for a high temperature thermocouple, comprising a hollow envelope of vitreous silica; and a pair of dissimilar thermocouple wires forming a thermocouple junction within the envelope and each connected to a different contact member extending from one end of the envelope, the thermocouple wires being disposed loosely within the envelope and separated between the junction and the contact members by barrier means formed by pinching together localized areas of the wall of the envelope to define a recess into which molten metal can flow to approach the thermocouple junction.

2. A hot junction element as claimed in claim 1, in which the recess defines a melt passage extending across the bore of the tube.

3. A hot junction element as claimed in claim 1, in which the contact members are pins pinched into the tube.

4. A hot junction element as claimed in claim 3, in which the pins are of dissimilar metals and act as compensating leads for the thermocouple wires.

5. A hot junction element as claimed in claim 4, in which the pins are physically distinguishable one from the other.

6. A high temperature thermocouple, comprising an elongated tube having a wall defining an interior of said tube intermediate longitudinally spaced ends thereof; a pair of thermocouple elements disposed within said tube and including a pair of dissimilar thermocouple wires having one pair of ends connected to each other, thereby forming a thermocouple junction, said elements having end portions extending out from said tube; an insulating means provided on said tube between said wires adjacently to said thermocouple junction for insulating said wires from contacting with one another and with molten material; and means for sealingly closing said ends of the tube so as to prevent molten material from entering said interior of the tube and operative for fixedly securing said thermocouple elements within said tube.

7. A thermocouple as defined in claim 6, wherein said insulating means comprises at least one recess provided on the wall of said tube, so that molten material can flow in said recess to approach the thermocouple junction.

8. A thermocouple as defined in claim 6, wherein said insulating means is a tubular element fixedly received in said interior and bounding a passage for molten material across the tube.

9. A thermocouple as defined in claim 6, wherein said tube is a vitreous material.

10. A thermocouple as defined in claim 9, wherein said material is silica.

11. A method of manufacturing a hot junction element for a high temperature thermocouple circuit comprising the steps of forming between the ends of a vitreous silica tube a deformed region to leave passages extending end-to-end of the tube on either side of said region, forming an assembly from two compensating pins and two thermocouple wires with the wires electrically connected at a junction adjacent one end and each electrically connected at the opposite end to a respective pin, inserting the assembly, pins first, into said passages so that the ends of the pins remote from the wires project from one end of the tube and the wires, intermediate the junction and the pins are separated within the tube by said deformed region, securing the pins within the tube adjacent to said one end of the tube and closing the opposite end of the tube to complete the element.

12. A method as claimed in claim 11, in which a refractory cement is allowed to set in the tube around the pins and around a few millimeters of the wires closest to the pins.

13. A method as claimed in claim 11 in which during the step of forming a deformed region in the tube a passage for melt extending across the bore of the tube is created.

* * * * *